(12) United States Patent
Kawasaki et al.

(10) Patent No.: US 7,792,555 B2
(45) Date of Patent: Sep. 7, 2010

(54) HINGE DEVICE AND PORTABLE ELECTRONIC APPARATUS

(75) Inventors: Yasuhiko Kawasaki, Fussa (JP); Mai Takase, Kodaira (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 631 days.

(21) Appl. No.: 11/731,171

(22) Filed: Mar. 30, 2007

(65) Prior Publication Data

US 2007/0227873 A1 Oct. 4, 2007

(30) Foreign Application Priority Data

Mar. 31, 2006 (JP) ............................. 2006-099825
Sep. 29, 2006 (JP) ............................. 2006-268284

(51) Int. Cl.
*H04M 1/00* (2006.01)
*H04M 9/00* (2006.01)
*E05D 7/00* (2006.01)
*E05D 3/10* (2006.01)

(52) U.S. Cl. .............................. 455/575.3; 379/433.13; 16/221; 16/367

(58) Field of Classification Search .............. 455/575.3; 379/433.13; 16/221, 239, 265, 273, 294, 16/366–370, 385–387
See application file for complete search history.

(56) References Cited

U.S. PATENT DOCUMENTS

| 4,391,020 A * | 7/1983 | Hsu ............................. 16/314 |
| 2003/0228847 A1 | 12/2003 | Matsumoto |
| 2005/0283949 A1 | 12/2005 | Lu et al. |

| 2006/0210060 A1 * | 9/2006 | Ishikawa et al. ........ 379/433.13 |

FOREIGN PATENT DOCUMENTS

| EP | 1 398 940 | 3/2004 |
| EP | 1 528 757 | 5/2005 |
| JP | 03-48117 | 8/1995 |
| JP | 2003-240000 | 8/2003 |
| JP | 2004-270821 | 9/2004 |
| JP | 2005-127449 | 5/2005 |

(Continued)

OTHER PUBLICATIONS

Office Action (with English translation) dated Apr. 24, 2008 issued for the counterpart Korean Patent Application No. 10-2007-0031378 (6 pgs.).

(Continued)

*Primary Examiner*—Vincent P Harper
(74) *Attorney, Agent, or Firm*—Cohen Pontani Lieberman & Pavane LLP

(57) ABSTRACT

A first turning member is formed in a bottomed cylindrical shape. A pivot is convexly formed on the bottom of the first turning member, and a packing is wound around the first turning member. A boss is convexly formed on one surface of a second turning member, and a packing is wound around the boss. A pivot opening is formed in the other surface of the second turning member. The boss is inserted into the first turning member. The pivot is inserted into a ring-shaped waterproof member and a plain washer. The waterproof member surrounds the pivot opening. The waterproof member is sandwiched between the bottom of the first turning member and the end surface of the boss.

9 Claims, 14 Drawing Sheets

FOREIGN PATENT DOCUMENTS

| | | |
|---|---|---|
| JP | 2005 331032 | 12/2005 |
| JP | 2006-019344 | 1/2006 |
| JP | 2006-042311 | 2/2006 |
| KR | 0387149 | 6/2005 |
| WO | WO 9318619 A1 * | 9/1993 |

OTHER PUBLICATIONS

Communication dated Aug. 8, 2007 issued for the corresponding European Patent Application No. EP 07 00 5501.

* cited by examiner

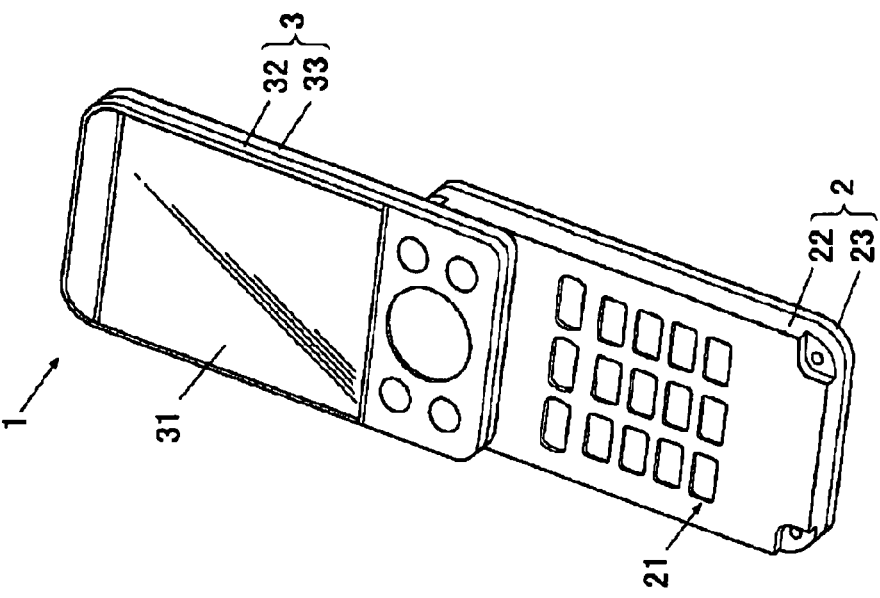
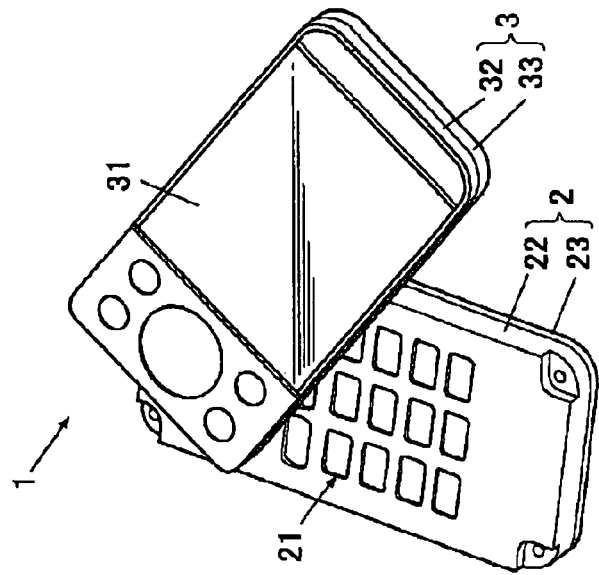
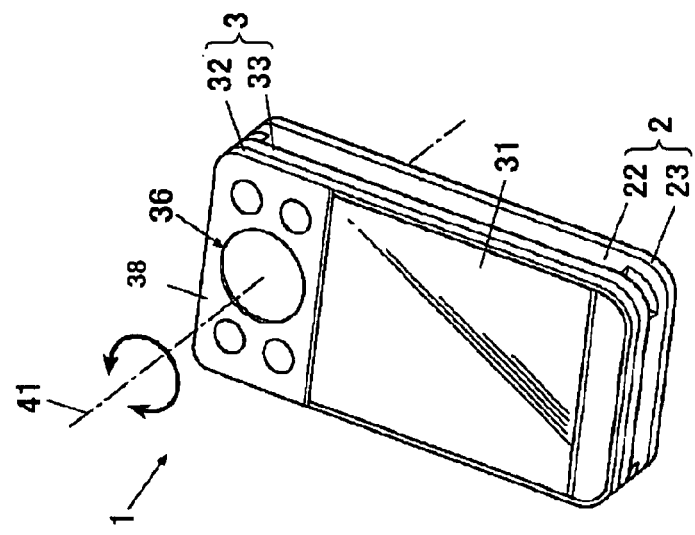

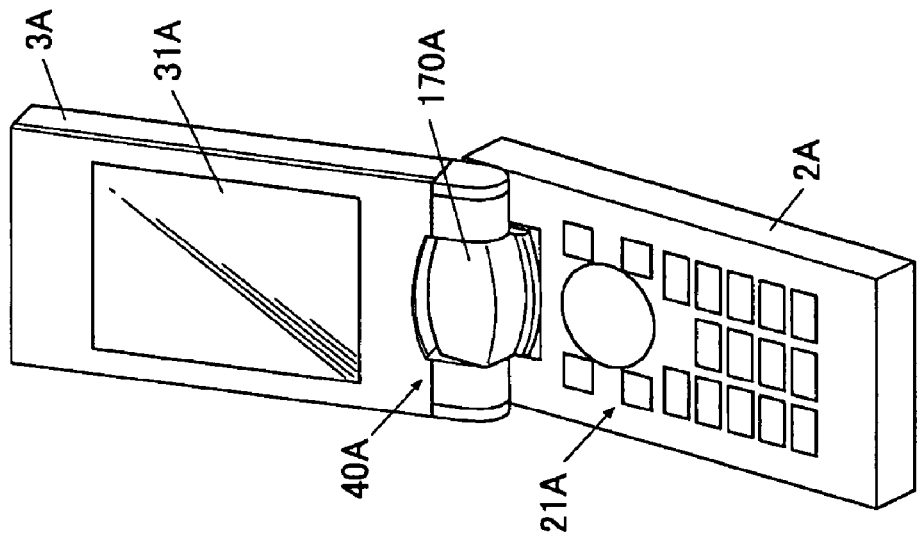
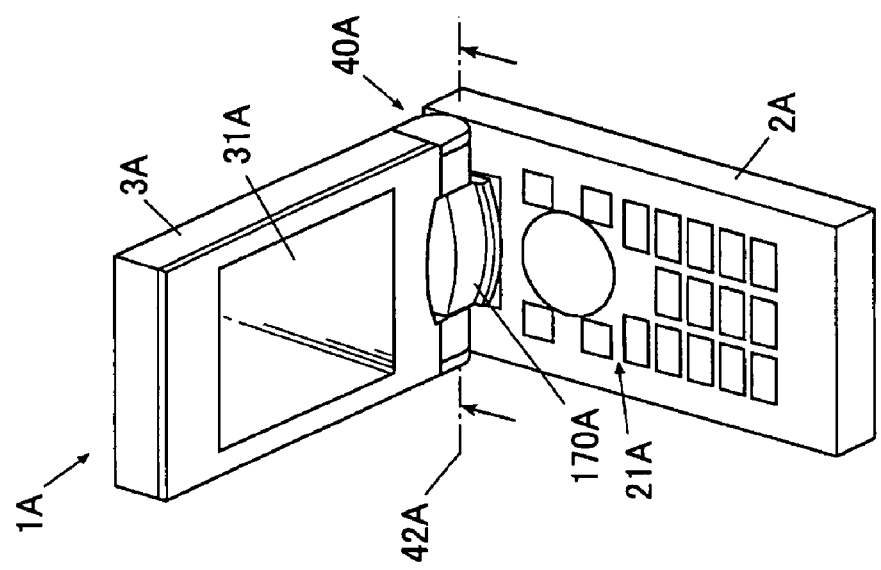
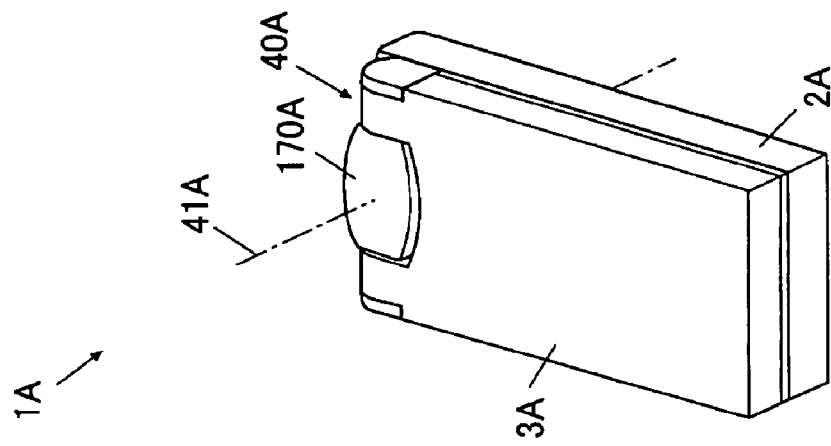

HINGE DEVICE AND PORTABLE ELECTRONIC APPARATUS

BACKGROUND OF THE INVENTION

1. Field of the Invention

The present invention relates to a hinge device which joins a first housing and a second housing of a portable electronic apparatus in a manner that the first housing and the second housing can turn around kept in generally parallel with each other, and a portable electronic apparatus using the hinge device.

2. Description of the Related Art

Recent portable electronic apparatuses such as portable phones include ones that have a first housing and a second housing, which turn around while being kept in generally parallel with each other (e.g., see Unexamined Japanese Patent Application KOKAI Publication No. 2004-270821). In such a portable electronic apparatus, the first housing and the second housing are joined by a hinge device. The first housing or the second housing turns around relatively to the second housing or the first housing, about an axial line that runs orthogonally to their surfaces facing each other.

The structure of such a hinge device is as follows.

(1) A first base is fixed on the first housing. (2) A second base is fixed on the second housing. (3) A pivot is fixed on the first base, and is pivotally supported by the second base. In this case, the pivot is inserted through a pivot opening in the second base. The radial load of the pivot is received by the second base. (4) A wire is provided in a way that it runs through a through hole provided along the axial line of the pivot. This wire electrically connects the circuit board in the first housing and the circuit board in the second housing.

Further known among such portable electronic apparatuses as described above are ones that can have their first housing and second housing turn around relatively not only about the above-described axial line (i.e., the axial line that runs orthogonally to the facing surfaces of the first housing and second housing), but also around an axial line that is orthogonal to the above-described axial line (e.g., see Unexamined Japanese Patent Application KOKAI Publication No. 2005-127449).

SUMMARY OF THE INVENTION

In such a portable electronic apparatus as described above, the hinge device needs to have a waterproof function, because external water might enter the first housing and the second housing though a gap in the pivot opening and the through hole.

The present invention was made in view of the above-described problem, and an object of the present invention is to provide a hinge device having a sufficient waterproof function and a portable electronic apparatus.

To achieve above object, a hinge device according to the present invention comprises: a first member having a pivot in which a through hole is formed in a direction of axis of the pivot, a second member having a pivot opening into which the pivot is inserted and capable of turning relatively to the first member about the pivot as a center of turn, and a waterproof member formed in a ring shape and sandwiched between the first member and the second member so as to surround the pivot and the pivot opening.

A portable electronic apparatus according to the present invention is a portable electronic apparatus having a first housing, a second housing, and a hinge device which joins the first housing and the second housing in a manner that the first housing and the second housing are capable of turning about an axial line orthogonal to a front surface of the first housing, wherein the hinge device comprises: a first member having a pivot in which a through hole is formed in a direction of axis of the pivot; a second member having a pivot opening into which the pivot is inserted and capable of turning relatively to the first member about the pivot as a center of turn; and a waterproof member formed in a ring shape and sandwiched between the first member and the second member so as to surround the pivot and the pivot opening, and wherein one of the first member and the second member is attached to the first housing with a first waterproof packing provided between them, and the other is attached to the second housing or a third housing joined to the second housing with a second waterproof packing provided between them.

According to the present invention, since the ring-shaped waterproof member is sandwiched between the first turning member and the second turning member so as to surround the pivot and the pivot opening, external water that enters through the gap between the first turning member and the second turning member can be prevented from flowing into the pivot opening.

Since the present invention comprises the through hole inside the pivot, in a case here, for example, electric circuits are provided inside the first housing and the second housing respectively, the wire to connect these electric circuits can be suitably provided through the hinge device of the present invention. This is because the wire can be let through the through hole. In such a state, the existence of this wire would not hinder the turning movements that would be realized by the hinge device of the present invention.

BRIEF DESCRIPTION OF THE DRAWINGS

These objects and other objects and advantages of the present invention will become more apparent upon reading of the following detailed description and the accompanying drawings in which:

FIGS. 1A to 1C are perspective diagrams of a portable phone according to a first embodiment;

FIGS. 7A to 7C are perspective diagrams of a portable phone according to a second embodiment;

DETAILED DESCRIPTION OF THE PREFERRED EMBODIMENTS

The best mode for carrying out the present invention will be explained below using the drawings. It should be noted that the embodiments to be described below include various limitations that are technically preferable for the present invention to be carried out, but these are not intended to limit the scope of the present invention to the embodiments and illustrated examples below.

First Embodiment

Figure 2:
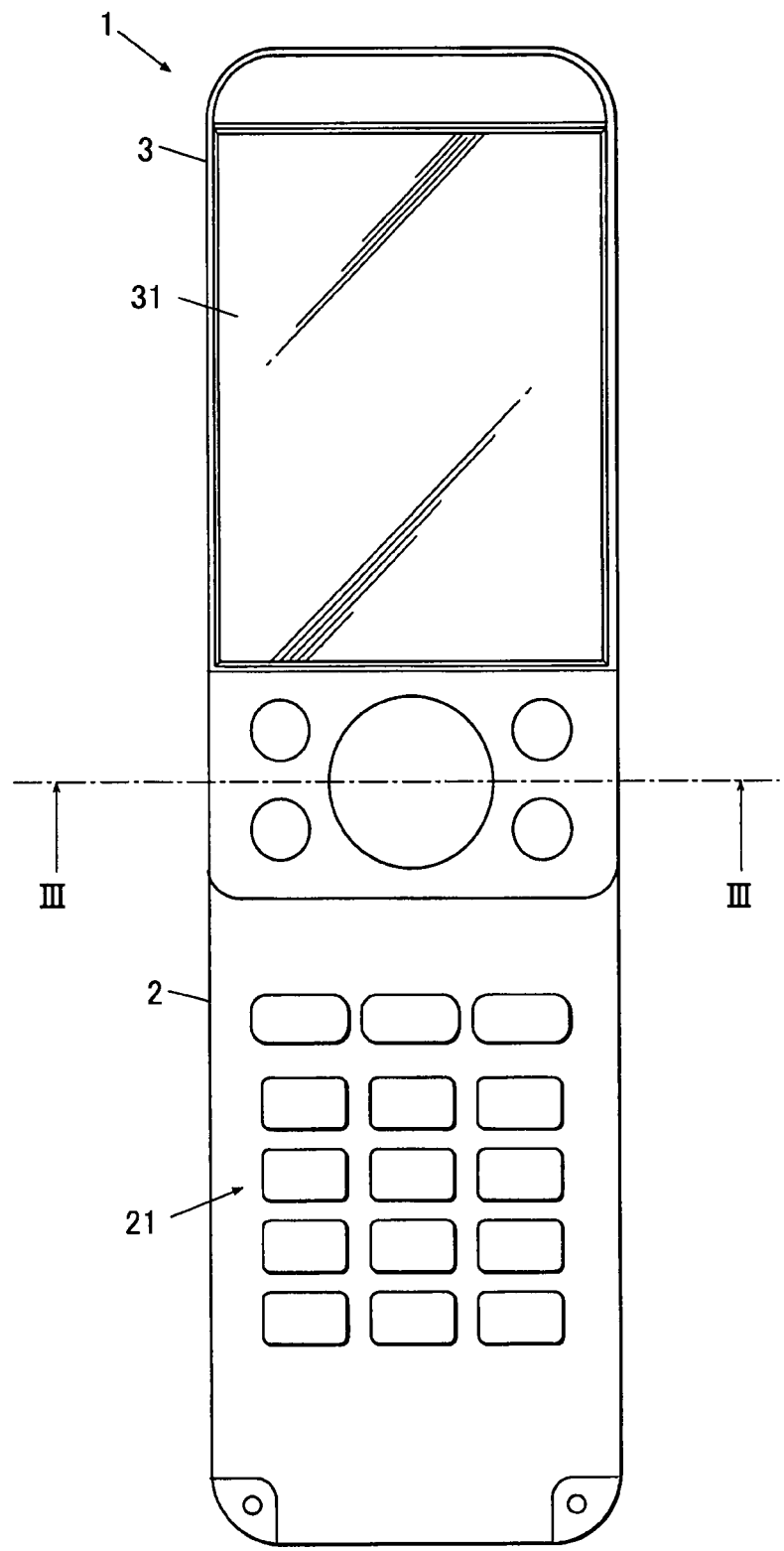
FIG. 2 is a front elevation of the portable phone according to the first embodiment.
Figure 3:
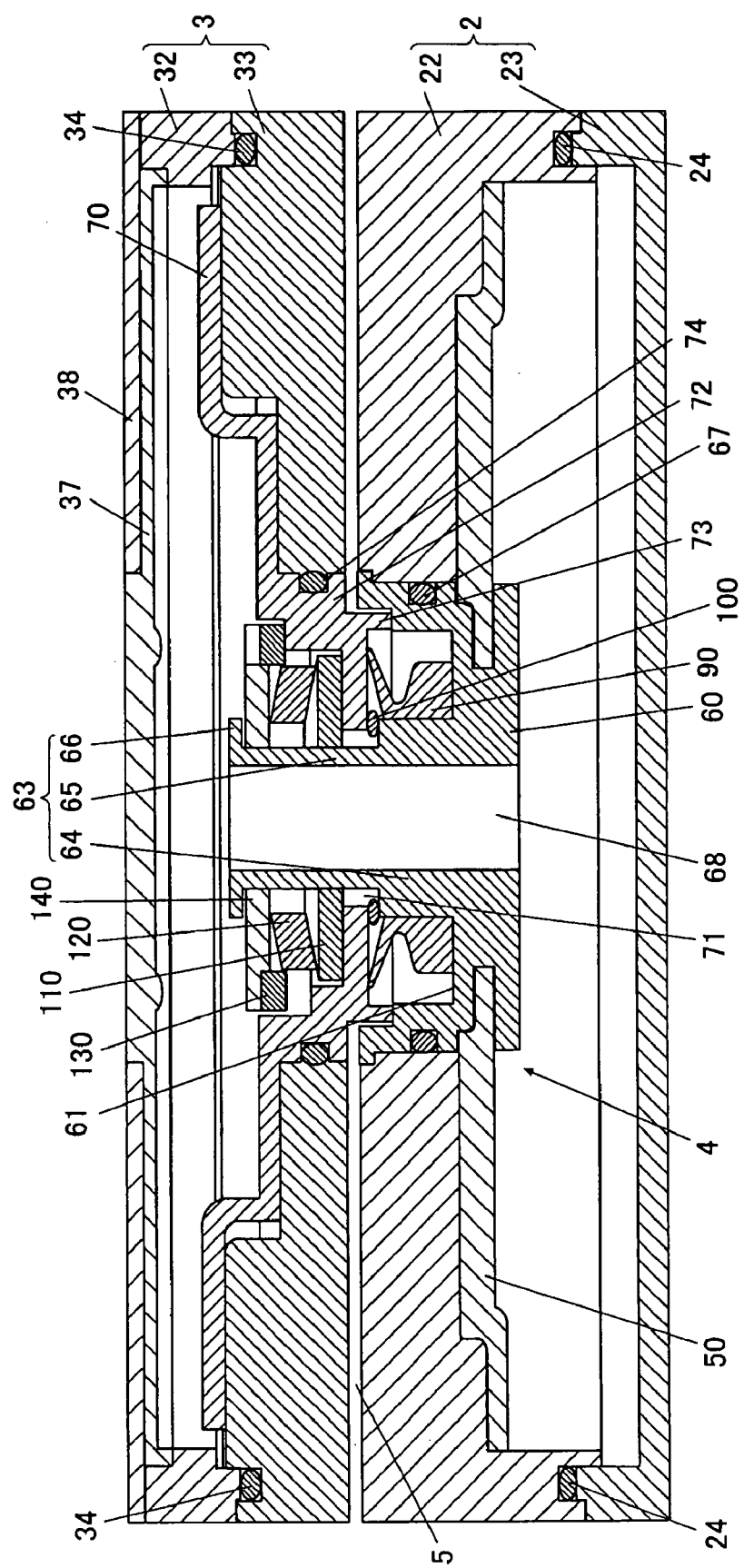
FIG. 3 is a cross sectional diagram on arrow along a line III-III of FIG. 2.

FIGS. 1A to 1C are perspective diagrams of a portable phone 1. FIG. 2 is a front elevation of the portable phone 1. FIG. 3 is a cross sectional view on arrow along a line III-III shown in FIG. 2.

As shown in FIGS. 1 to 3, the portable phone 1 comprises a first housing 2, a second housing 3, and a hinge device 4 that joins the first housing 2 and the second housing 3. The first housing 2 comprises a front case 22 and a rear case 23, which are fitted together with a rubber waterproof ring 24 between them. The second housing 3 comprises a front case 32 and a rear case 3, which are fitted together with a rubber waterproof ring 34 between them.

A key operation section 21 is provided on the front surface of the first housing 2. The key operation section 21 includes, for example, ten keys and other function keys. The edges of a key rubber for the key operation section 21 is adhered onto the internal surface of the front case 22, or the waterproof ring 24 is provided on the edges of a key rubber, so the key operation section 21 is waterproofed.

A transparent display window 31 is formed on the front surface of the second housing 3. A display panel is contained inside the second housing 3, and the display surface of the display panel faces the display window 31. A key operation section 36 is provided on the front surface of the second housing 3. The key operation section 36 includes a cursor key. The key operation section 36 is waterproofed, with the edges of a key rubber 37 adhered on the internal surface of a key plate 38, which is attached on the top surface of the front case 32.

The hinge device 4 joins the first housing 2 and the second housing 3 in a state that the front surface of the first housing 2 and the rear surface of the second housing 3 face each other. An axial line 41 of the hinge device 4 is orthogonal to the front and rear surfaces of the second housing 3 and the front and rear surfaces of the first housing 2. The hinge device 4 makes the second housing 3 or the first housing 2 capable of turning around with respect to the first housing 2 or the second housing 3, while being kept in a state that the rear surface of the second housing 3 is generally parallel with the front surface of the first housing 2.

FIG. 1A shows a state that the outer rim of the second housing 3 comes exactly upon the outer rim of the first housing 2, when seen in the direction of the axial line 41. FIG. 1C shows a state that the second housing 3 turns by 180 degrees from the state of FIG. 1A. FIG. 1B shows a state that is seen between when the state is as shown in FIG. 1A and when the state is as shown in FIG. 1C.

The first housing 2 and the second housing 3 can turn around relatively to each other, as described above. In the following description, one-sided expressions like "the second housing 3 turns relatively to the first housing 2" and "the first housing 2 turns relatively to the second housing 3" might be possibly used to simplify the explanation. However, the readers should be reminded that such an expression will just imply that both of them can turn around relatively to each other.

The hinge device 4 comprises two turning members which turn relatively to each other about the axial line 41 as the center of turn. One of the two turning members is attached on the first housing 2, and the other is attached on the second housing 3.

Figure 4:
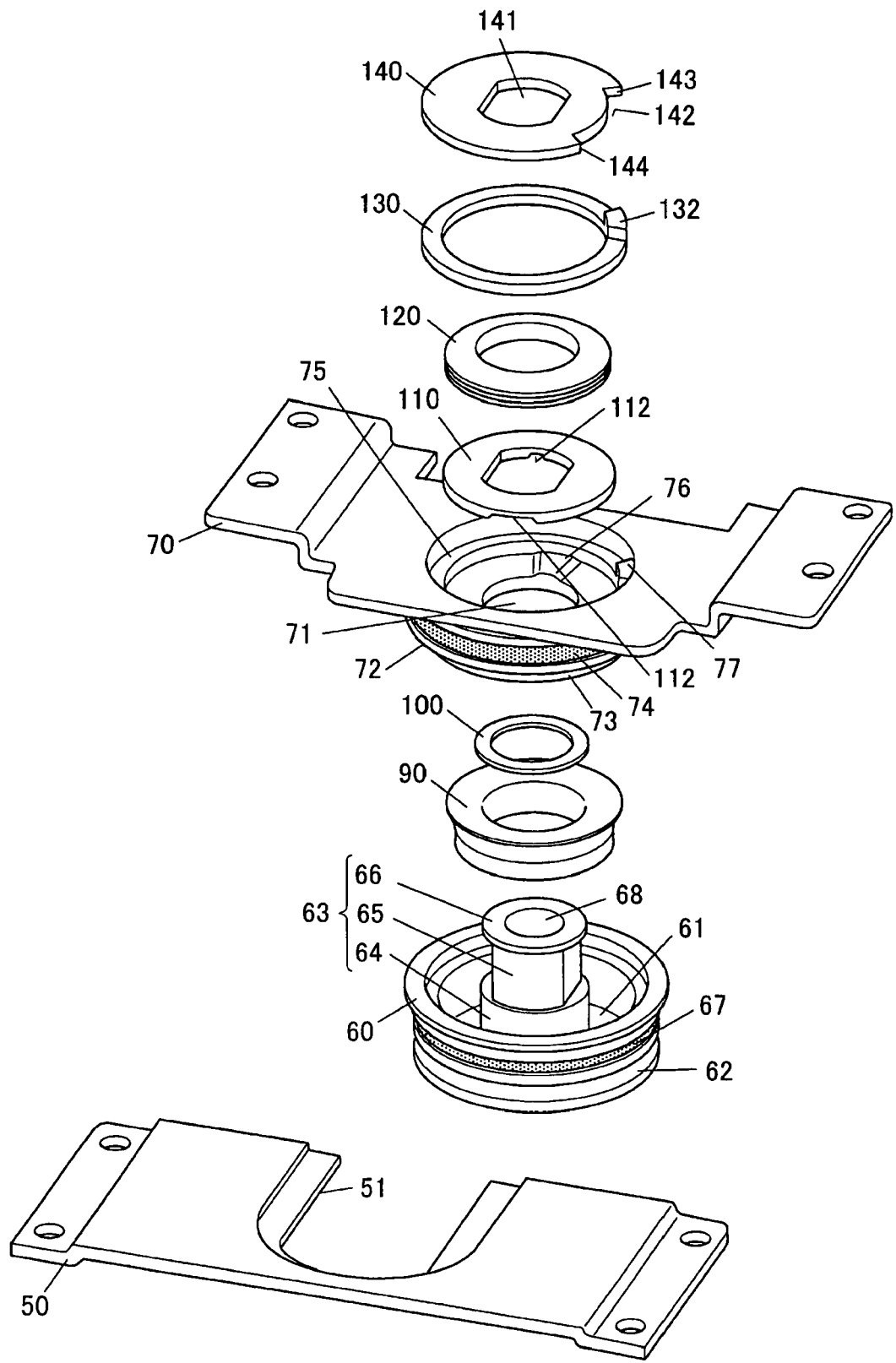
FIG. 4 is an exploded perspective diagram of a hinge device according to the first embodiment.

Next, the structure of the hinge device 4 will be specifically explained with reference to FIGS. 3 to 5. FIG. 4 is an exploded perspective diagram of the hinge device 4, and FIG. 5 is another exploded perspective diagram seen from a different angle from that of FIG. 4.

Figure 5:
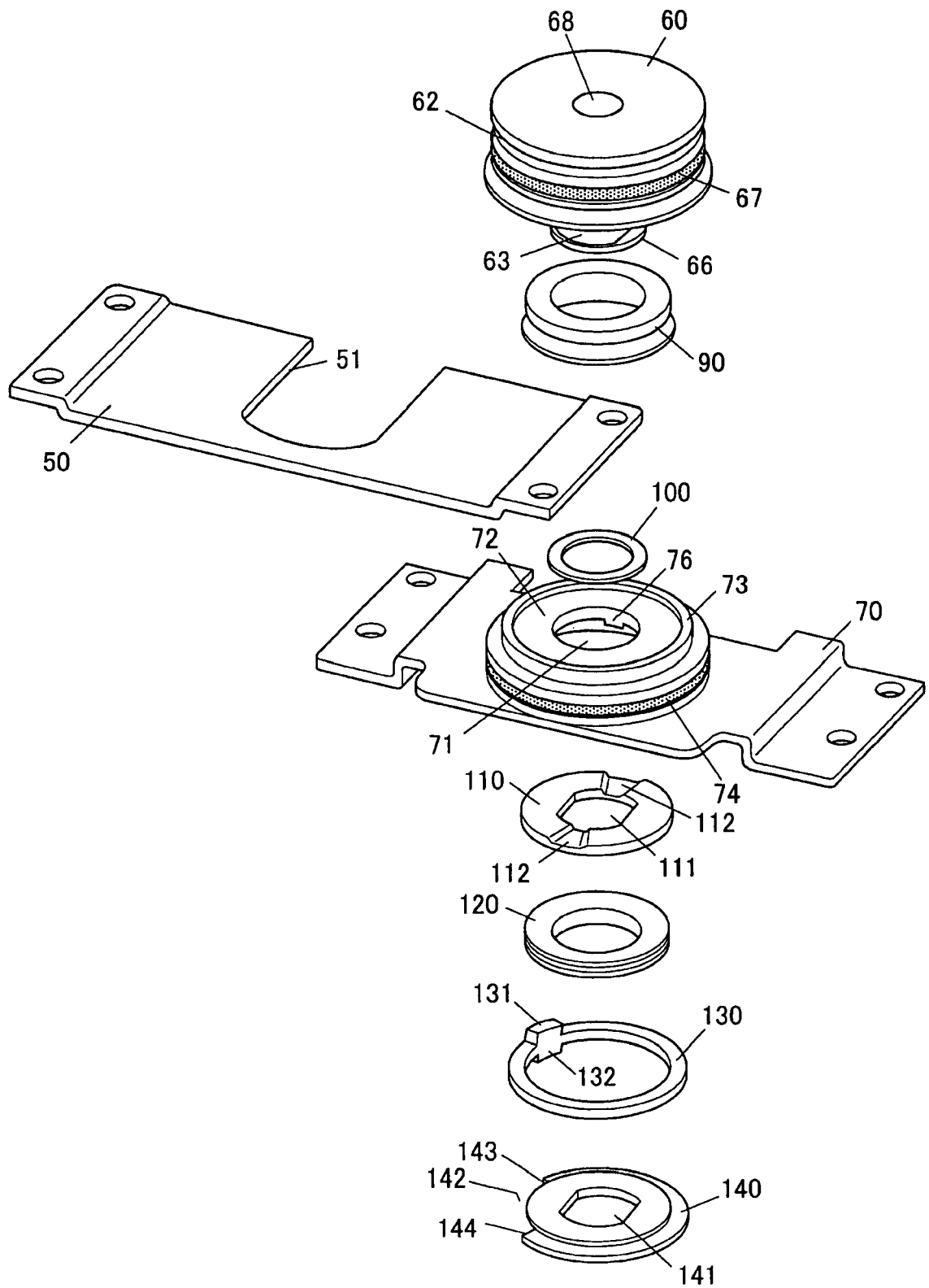
FIG. 5 is an exploded perspective diagram seen from a different angle from that of FIG. 4.

As shown in FIGS. 3 to 5, the hinge device 4 comprises a first turning member 60 having a pivot 63, and a second turning member 70 having a pivot opening 71, through which the pivot 63 is inserted. Though the details will be described later, the pivot 63 is protected from falling off the pivot opening 71 when it is inserted through the pivot opening 71. In this state, the first turning member 60 and the second turning member 70 can turn relatively to each other about the axial line 41 (the center of axle of the pivot 63) as the center of turn.

The first turning member 60 has a generally bottomed-cylindrical shape. The first turning member 60 is internally stepped. That is, the inner diameter of the first turning member 60 at a side closer to the bottom 6 is smaller than that at a side closer to the free opening of the first turning member 60.

Inside the first turning member 60, the pivot 63 projects from the bottom 61 of the first turning member 60 in the direction perpendicular to the bottom 61. The pivot 63 is formed integrally with the first turning member 60.

A groove 62 is concavely formed in the outer circumferential surface of the first turning member 60, in the circumferential direction. The groove 62 is provided for a bracket 50 to be fitted therein. The bracket 50 is a supplementary member for attaching the first turning member 60 to the first housing 2. The bracket 50 has a cutout 51, which is open at an edge of the bracket 50. The edge portion of the cutout 51 is fitted into the groove 62. It is inside the first housing 2, where the bracket 50 is fitted into the groove 62. The depth of the groove 62 is not uniform, so that the bracket 50 may not turn with respect to the first turning member 60 when the bracket 50 is fitted in the groove 62.

The bracket 50 is fixed on the internal surface of the front case 22 of the first housing 2 by screws or the like. Thus, the first turning member 60 is fixed on the first housing 2.

Another groove is concavely formed in the outer circumferential surface of the first turning member 60 in the circumferential direction, and a ring-shaped first packing 67 is fitted in the groove. The first packing 67 is for waterproofing an opening 25 (see FIG. 6) formed in the front case 22 of the first housing 2, and is made of elastic material such as rubber, etc.

A through hole 68 runs through inside the pivot 63 along the axial line 41. A portion 64 of the pivot 63 that is close to the bottom of the pivot 63 is formed in a cylindrical shape.

On the other hand, a portion 65 of the pivot 63 that is close to the leading end of the pivot 63 is formed in a tubular shape. Here, the term "tubular" is used to be distinguished from the aforesaid "cylindrical". That is, the portion 65 close to the leading end is not circumferentially circular, but the distance from the axial line 41 to a given point on the circumferential surface of the portion 65 is different from the distance from the axial line 41 to another point on the circumferential surface of the portion 65.

With these things taken into consideration, the portion 64 closer to the bottom of the pivot 63 will be referred to as cylindrical portion 64 and the portion 65 closer to the leading end will be referred to as polygonal tubular portion 65.

In FIGS. 3 to 5, a flange 66 is formed on the leading end of the pivot 63. This flange 66 is formed by the leading end of the pivot 63 being staked after the hinge device is assembled. Hence, the flange 66 on the leading end of the pivot 63 is not formed before the hinge device 4 is assembled.

The pivot 63 is inserted through a ring-shaped waterproof member 90, a plain washer 100, the pivot opening 71 of the second turning member 70, a click ring 110, a ring-shaped disk spring 120, a ring-shaped stopper 130, and a ring-shaped restricting ember 140, in this order.

The plain washer 100 strikes the top end surface of the cylindrical portion 64.

The waterproof member 90 forms a generally cylindrical shape, and has its upper end portion, which strikes the lower surface of the second turning member 70, stretch like a trumpet. The waterproof member 90 is made of rubber relatively hard. The cylindrical portion 64 of the pivot 63 can fit in the waterproof member 90. The inner diameter of the waterproof member 90 is equal to the outer diameter of the cylindrical portion 64 of the pivot 63. The waterproof member 90 strikes the bottom 61 of the first turning member 61.

The pivot opening 71 of the second turning member 70 penetrates through generally the center portion of the second turning member 70. The pivot opening 71 penetrates through the center portion of a circular boss 72, which is formed to project from one surface (the surface at the side of the first turning member 60) of the second turning member 70. The outer diameter of the boss 72 is larger than the outer diameter of the first turning member 60. A ring-shaped convex 73 is formed on the lower end surface of the boss 72 along the rim of the boss 72. A groove is formed in the outer circumferential surface of the boss 72 in the circumferential direction, and a ring-shaped second packing 74 is fitted in the groove. The second packing 74 is for waterproofing an opening 35 (see FIG. 6) formed in the rear case 33 of the second hosing 3, and is made of elastic material such as rubber, etc.

In the state that the pivot 63 is inserted through the pivot opening 71, a part of the boss 72 is fitted in the first turning member 60, and the ring-shaped convex 73 strikes the step, which links the smaller-diameter portion of the first turning member 60 that is closer to the bottom 61 and the larger-diameter portion that is closer to the free opening of the first turning member 60.

The diameter of the pivot opening 71 is smaller than the inner diameter of the waterproof member 90, and the upper end portion of the waterproof member 90 that stretches like a trumpet strikes the lower end surface of the boss 72 so as to surround the pivot opening 71. The waterproof member 90 is sandwiched between the lower end surface of the boss 72 and the bottom 61 of the first turning member 60. Being sandwiched between the lower end surface of the boss 72 and the bottom 61 of the first turning member 60, the waterproof member 90 is compressed and deformed, though slightly.

The plain washer 100 is sandwiched between the lower end surface of the boss 72 and the upper surface of the cylindrical portion 64.

A circular stepped concave 75 is formed in the other surface of the second turning member 70 around the pivot opening 71. Two convexes 76 are formed on the deeper bottom of the stepped concave 75, and these two convexes 76 are positioned 180-degrees apart with respect to the axial line 41. A projection 77 is formed on the shallower bottom of the stepped concave 75. The projection 77 is positioned 90-degrees apart from the convexes 76 with respect to the axial line 41.

The shape of an opening 111 of the click ring 110 matches the shape of the outer circumference of the polygonal tubular portion 65 of the pivot 63, and the polygonal tubular portion 65 is fitted into this opening 111. Thus, the click ring 110 is fixed on the pivot 63, and the pivot 63 and the click ring 110 can turn integrally. The click ring 110 strikes the bottom of the stepped concave 75. Two concaves 112 are formed in the surface of the click ring 110 that strikes that bottom. The two concaves 112 are positioned 180-degrees apart with respect to the axial lie 41. The convexes 76 enters the concaves 112. The convexes 76 slip from the concaves 112 when the click ring 110 turns.

The outer circumference of the click ring 110 is circular. The click ring 110 has its radial load received by the wall of the stepped concave 75 to have the pivot 63 pivotally supported.

The disk spring 120 is annular, and independent from the pivot 63. The disk spring 120 is inclined to a plane orthogonal to the axial line 41, and thereby elastically deformed in the direction of the axial line 41.

The diameter of the stopper 130 is larger than the diameter of the disk spring 120, so the disk spring 120 is inside the stopper 130. A projection 131 is formed on one surface of the stopper 130, and a projection 132 is also formed on the other surface thereof. The stopper 130 is inserted to the shallower bottom of the stepped concave 75.

The shape of an opening 141 of the restricting member 140 matches the shape of the outer circumference of the polygonal tubular portion 65 of the pivot 63, and the polygonal tubular portion 65 is fitted in the opening 141. The restricting member 140 is thereby fixed on the pivot 63, and the restricting member 140 and the click ring 110 turn integrally. An arcing cutout 142 is formed in the rim of the restricting member 140, and the projection 132 of the stopper 130 is somewhere in this cutout 142. The cutout 142, the projection 132, the projection 131, and the projection 77 restrict the turning angle to slightly larger than a limit of 180 degrees.

The flange 66 of the pivot 63 strikes the restricting member 140 around the opening 141 of the restricting member 140. The click ring 110, the disk spring 120, and the restricting member 140 are sandwiched between the flange 66 and the deeper bottom of the stepped concave 75. Further, the waterproof member 90, the bottom of the stepped concave 75 (or the lower end surface of the boss 72), the click ring 110, the disk spring 120, and the restricting member 140 are sandwiched between the flange 66 and the bottom 61 of the first turning member 60. In this manner, the flange 66 prevents the pivot 63 from slipping from the second turning member 70, the waterproof member 90, the plain washer 100, the click ring 110, the disk spring 120, the stopper 130, and the restricting member 140.

The disk spring 120 and the waterproof member 90 are slightly compressed and deformed in this sandwiched state. Since the waterproof member 90 is pressured to contact the lower end surface of the boss 72 and the bottom 61 of the first turning member 60 around the pivot opening 71, even if water enters from outside through the gap between the inner wall of the free opening of the first turning member 60 and the outer wall of the ring-shaped convex 73 of the second turning member 70, the water can be prohibited from entering the pivot opening 71.

The working of the hinge device 4 will be explained.

The state shown in FIG. 4 corresponds to the state shown in FIG. 1C. In this state, the convexes 76 enter the concaves 112 of the click ring 110. Further, in this state, since the projection 132 of the stopper strikes one end 143 of the cutout 142 and the projection 131 strikes the projection 77, the second turning member 70 can turn to one side relatively to the first turning member 60 but cannot turn to the other side. That is, the second turning member 70 can only turn in a direction that is reverse to the turning direction when the state of FIG. 1A shifts to the state of FIG. 1C.

When the second turning member 70 is caused to turn in the aforementioned direction relatively to the first turning member 60, the convexes 76 slip from the concaves 112. When the convexes 76 slip from the concaves 112, the click ring 110 deforms the disk spring 120. Therefore, the user can feel the repulsive force of the disk spring 120 as a clicking touch.

Then, when second turning member 70 turns by 180 degrees relatively to the first turning member 60, the convexes 76 enter the concaves 112 on the other sides respectively. At this time, the disk spring 120 is restored to its original shape, and the user can feel the restoring force as a clicking touch. In this state, the projection 77 formed on the second turning member 70 is at a position turned by 180 degrees from the projection 131 of the stopper 130. Therefore, the second turning member 70 can turn to both the left and the right directions.

When the second turning member 70 is caused to turn relatively to the first turning member 60, the waterproof member 90 slides on the lower end surface of the boss 72 of the second turning member 70. In this case, since the portion of the waterproof member 90 that contacts the lower end surface of the boss 72 is the portion at the upper end that stretches like a trumpet and this portion contacts the lower end surface of the boss 72 with a pressure, the waterproofed state can be maintained.

Further, since the ring-shaped convex 73 formed on the lower surface of the second turning member 70 strikes the step portion of the first turning member 60 that links the smaller-diameter portion close to the bottom 61 and the larger-diameter portion close to the free opening, the second turning member 70 shakes less, when turning relatively to the first turning member 60.

Figure 6:
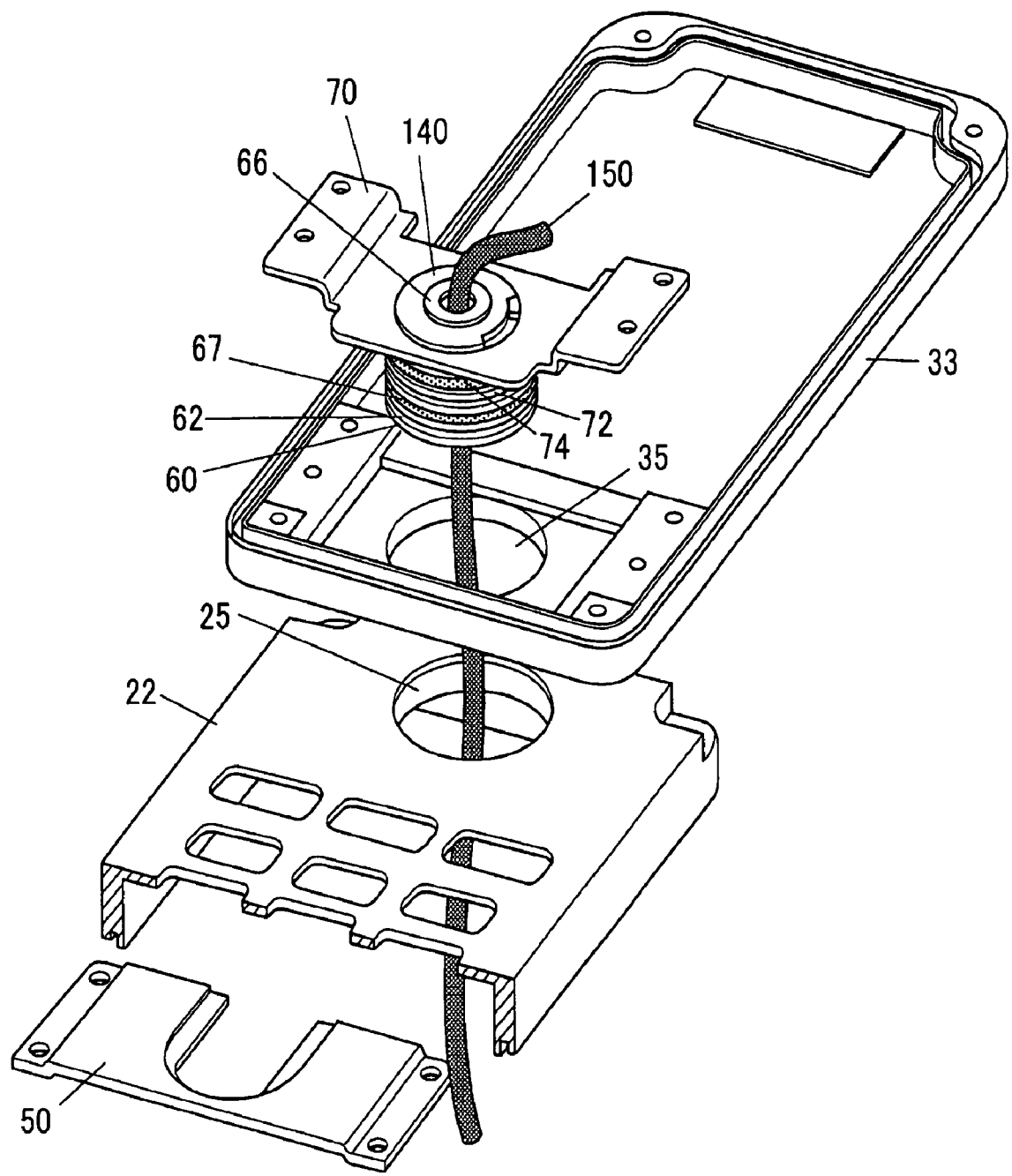
FIG. 6 is an exploded perspective diagram of the portable phone according to the first embodiment.

Next, how to attach the hinge device 4 will be explained with reference to FIG. 3 and FIG. 6. FIG. 6 is an exploded perspective diagram of the portable phone 1. FIG. 6 mainly shows the rear case 33 of the second housing 3, the front case 22 of the first housing 2, and the hinge device 4, where the front case 22 of the first housing 2 is partially broken.

As shown in FIGS. 3 and 6, a first opening 25 is formed through the front case 22 of the first housing 2, and a second opening 35 is formed through the rear case 33 of the second housing 3.

When the hinge device 4 is attached to the second housing 3 and the first housing 2, the hinge device 4 is assembled beforehand. When assembled beforehand, the components of the hinge device 4 except the bracket 50 are assembled in the arrangement shown in FIG. 4, and the leading end of the pivot 63 is staked so that the components are unitized. The first turning member 60 of the unitized hinge device 4 is inserted through the second opening 35 from the internal side of the second housing 3 (the inner surface side of the rear case 33). The second turning member 70 of the hinge device 4 is fixed on the inner surface of the rear case 33 of the second housing 3 by screws or the like.

Next, the first turning member 60 of the unitized hinge device 4 is inserted through the first opening 25 from the front side of the first housing 2 (the front surface side of the front case 22). In this state, the edge portion of the cutout 51 of the bracket 50 is slid into the groove 62. After this, the bracket 50 is fixed on the inner surface of the front case 22 of the first housing 2 by screws or the like. A wire 150 is let through the through hole 68 inside the pivot 63 after the unitized hinge device 4 is fixed on the rear case 33 of the second housing 3 and the front case 22 of the first housing 2 in the way described above. The wire 150 is connected to a circuit board contained in the second housing 3 and to the circuit board contained in the first housing 2. For example, the wire 150 is a bundle of thin coaxial cables. FIG. 3 omits illustration of the wire 150 to make the diagram understandable.

The rear case 23 of the first housing 2 is attached to the front case 22 after the circuit board, etc. are mounted on the front case 22 or the rear case 23. The front case 32 of the second housing 3 is attached to the rear case 33 after the circuit board, etc. are mounted on the front case 32 or the rear case 33.

As described above, according to the present embodiment, the first packing 67 prevents water that comes through a gap 5 (shown in FIG. 3) between the second housing 3 and the first housing 2 from entering the first housing 2 through the first opening 25. Further, the second packing 74 prevents the water from the gap 5 from entering the second housing 3 through the second opening 35. Further, the waterproof member 90 prevents the water from the gap 5 from entering the second housing 3 through the pivot opening 71.

According to the above-described embodiment, the illustrated portable phone 1 is structured such that the first housing 2 and the second housing 3 can turn relatively about an axis which is orthogonal to the front and rear surfaces of these housings. However, the present invention can also be applied to a foldable electronic apparatus whose first housing 2 and second housing 3 can not only turn relatively about an axis that is orthogonal to the front and rear surfaces of the housings but can turn about an axis that is perpendicular to that axis. Such an application will be explained below as a second embodiment.

Second Embodiment

Figures 8A, 8B, 8C, 8D:
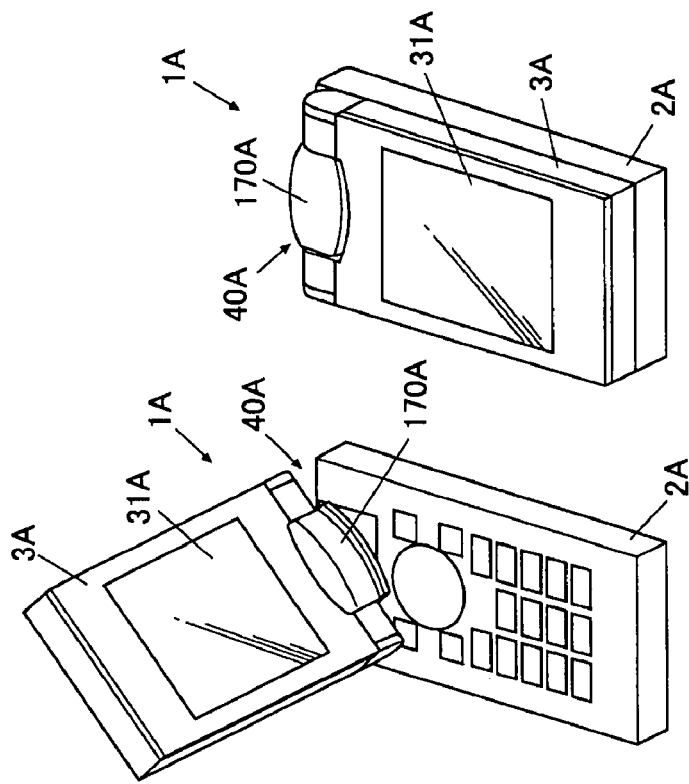
FIGS. 8A to 8D are perspective diagrams of the portable phone according to the second embodiment.
Figure 9:
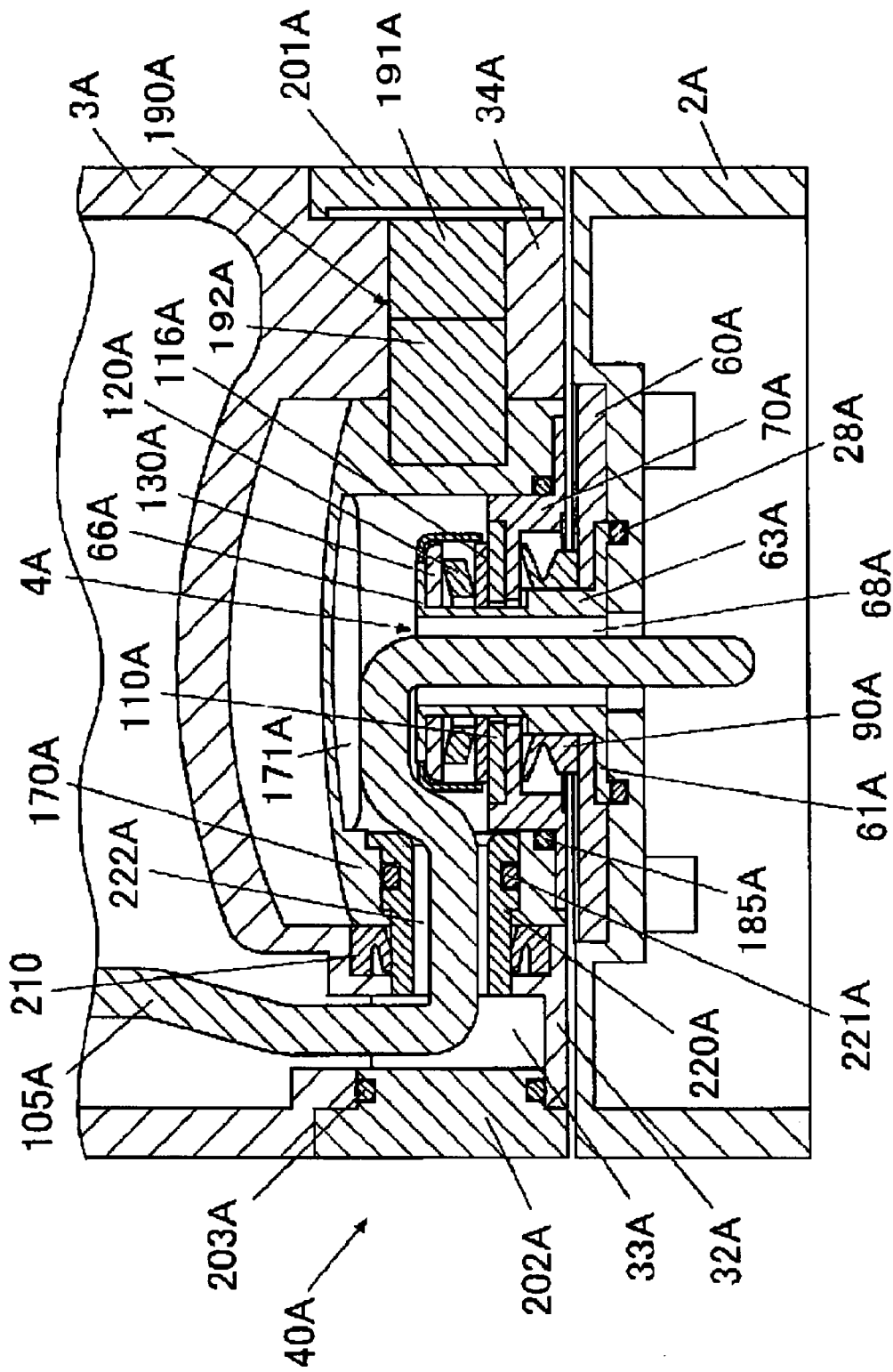
FIG. 9 is a cross sectional diagram on arrow along an axial line 42A of FIG. 7B.

FIGS. 7 and 8 are perspective diagrams of a portable phone 1A, and FIG. 9 is a cross sectional view on arrow along an axial line 42A show in FIG. 7B.

As shown in FIGS. 7 to 9, the portable phone 1A comprises a first housing 2A, a second housing 3A, and a biaxial hinge assembly 40A which joins the first housing 2A and the second housing 3A. A key operation section 21A is provided on the front surface of the first housing 2A. The key operation section 21A includes ten keys, etc. A transparent display window 31A is provided on the front surface of the second housing 3A. A display panel is contained in the second housing 3A, and the display surface of the display panel faces the display window 31A. Likewise in the first embodiment, each of the first housing 2A and the second housing 3A has its front case and rear case fitted together with a rubber waterproof ring, though not illustrated, placed between them.

The biaxial hinge assembly 40A has an axial line 41A that is orthogonal to the front surface of the first housing 2A, and an axial line 42A that extends in the widthwise direction of the second housing 3A between the front and rear surfaces of the second housing 3A. The axial line 41A and the axial line 42A are orthogonal to each other. The biaxial hinge assembly 40A enables the second housing 3A to turn relatively to the first housing 2A about the axial line 41A. The biaxial hinge assembly 40a also enables the second housing 3A to turn relatively to the first housing 2A about the axial line 42A. As shown in FIG. 7, the second housing 3A is opened from or closed to the first housing 2A by the second housing 3A being turned about the axial line 42A. As shown in FIG. 8, the second housing 3A is turned relatively to the first housing 2A or turned upside down by the second housing 3A being turned about the axial line 41A.

FIG. 7A shows a state that the second housing 3A and the first housing 2A are closed with the front surface of the second housing 3A facing the front surface of the first housing 2A. FIG. 7C shows a state that the second housing 3A and the first housing 2A are opened with the front surface of the second housing 3A and the front surface of the first housing 2A facing forward. FIG. 7B shows a state which appears between the state of FIG. 7A and the state of FIG. 7C when the housings are opened from the state of FIG. 7A to the state of FIG. 7C or closed reversely.

FIG. 8A shows a state that the second housing 3A and the first housing 2A are closed with the front surface of the second housing 3A facing the front surface of the first housing 2A. FIG. 8B shows a state that the second housing 3A is turned about the axial line 41A with the front surface of the second housing 3A facing the front surface of the first housing 2A. FIG. 8C shows a state that the second housing 3A is turned about the axial line 42A. FIG. 8D shows a state that the second housing 3A and the first housing 2A are closed with the rear surface of the second housing 3A facing the front surface of the first housing 2A.

As shown in FIG. 9, the biaxial hinge assembly 40A comprises a hinge device 4A which enables the second housing 3A to turn relatively to the first housing 2A about the axial line 41A, and a hinge mechanism (a hinge unit 190A, etc.) which enables the second housing 3A to turn relatively to the first housing 2A about the axial line 42A.

Figure 10:
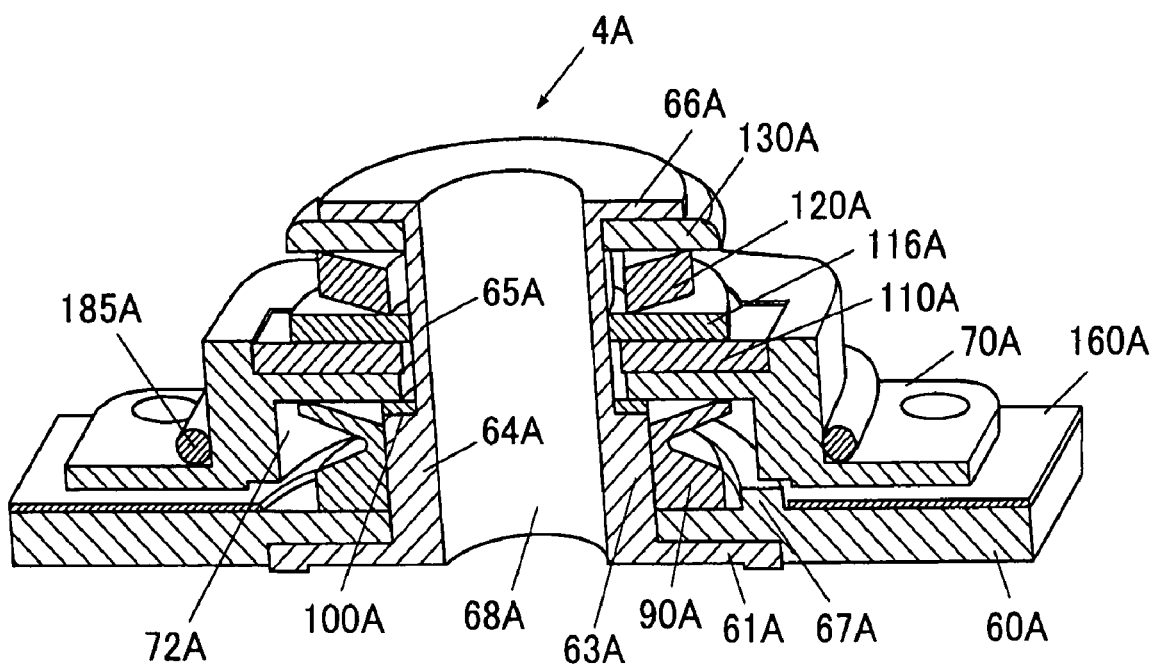
FIG. 10 is a perspective diagram showing a hinge device according to the second embodiment in a broken state.
Figure 11:
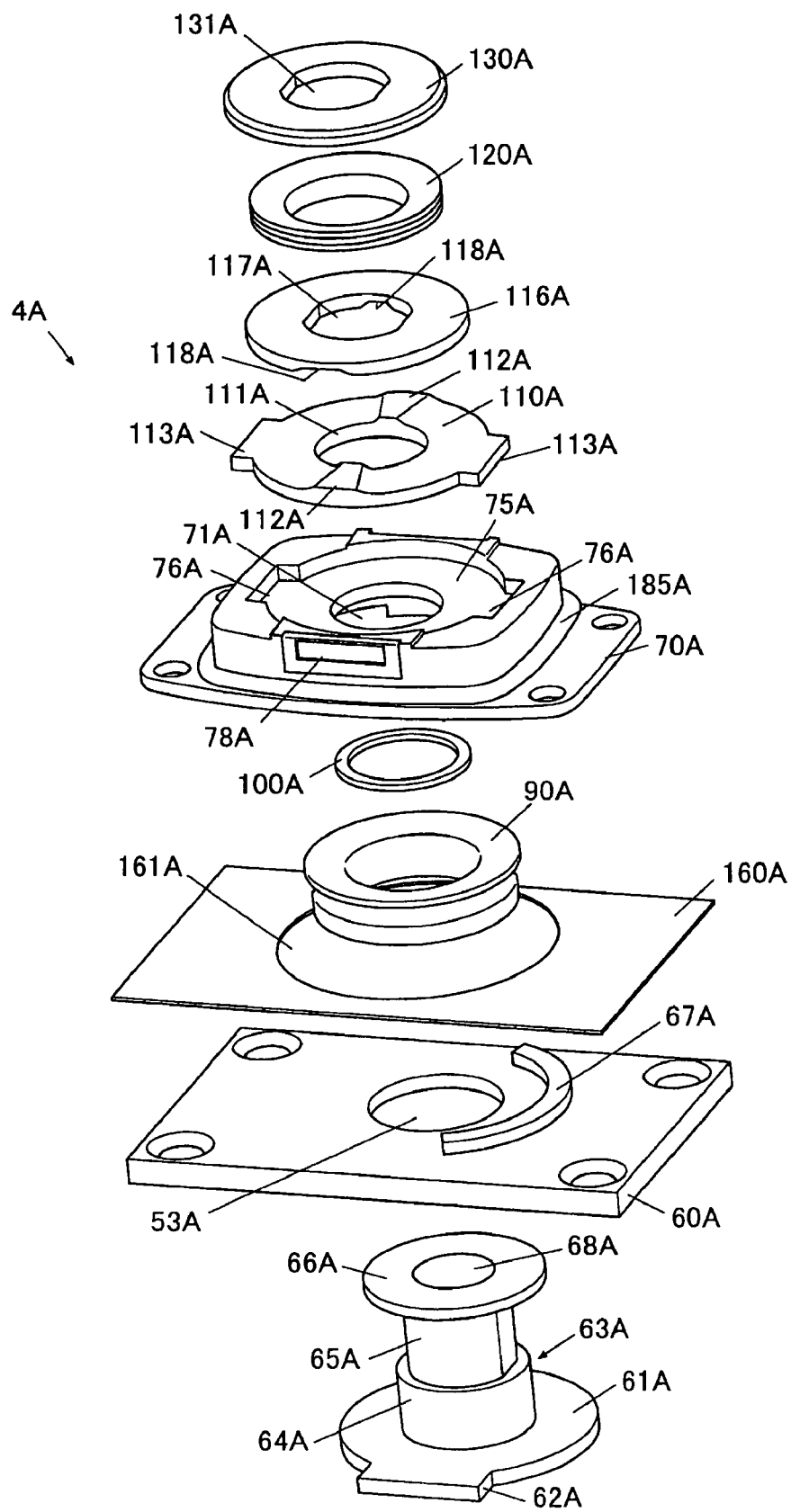
FIG. 11 is an exploded perspective diagram of the hinge device according to the second embodiment.
Figure 12:
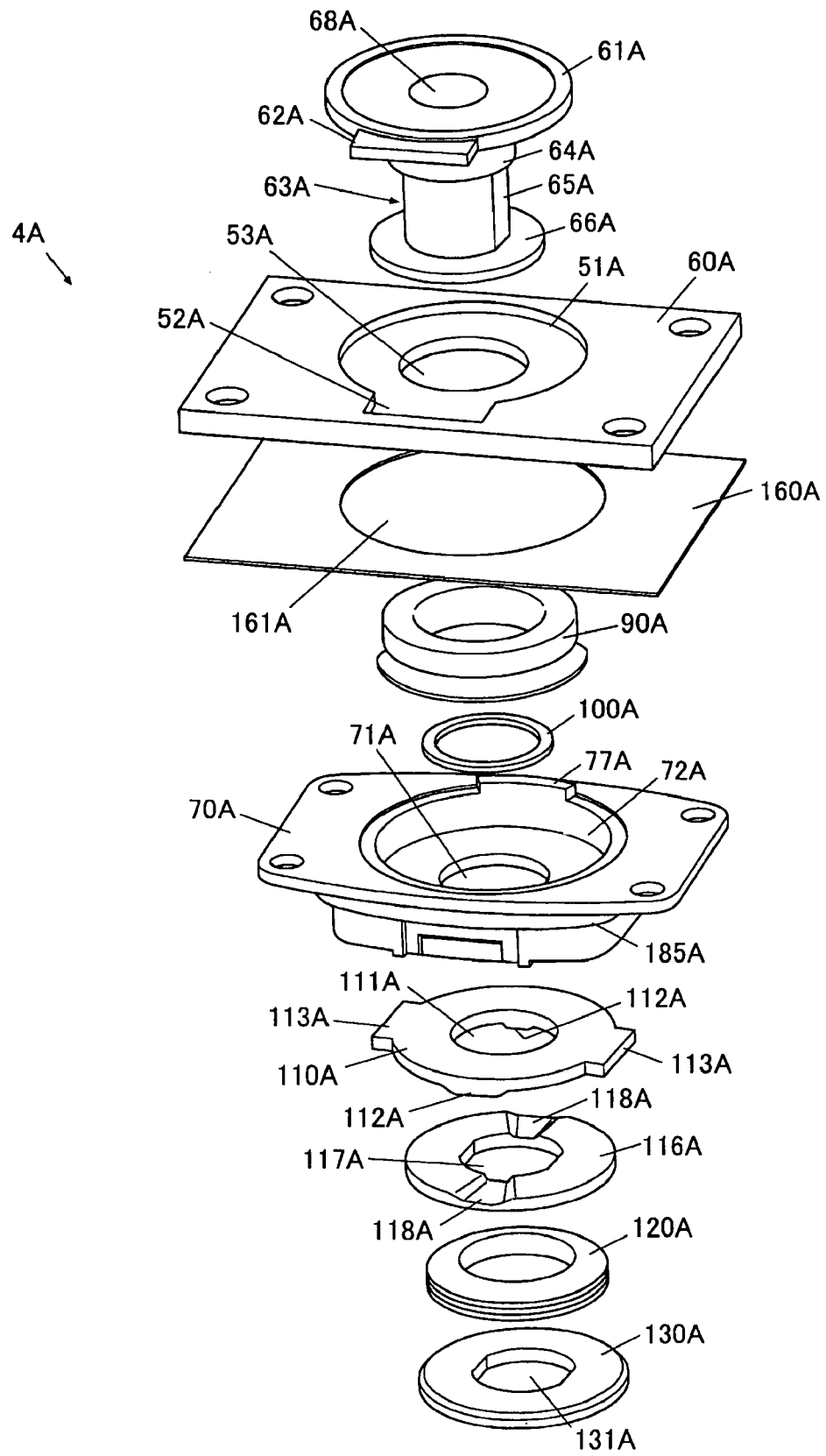
FIG. 12 is an exploded perspective diagram seen from a different angle from that of FIG. 11.

Next, the structure of the hinge device 4A will be explained in detail with reference to FIGS. 9 to 12. FIG. 10 is a perspective diagram of the hinge device 4A which is broken along a plane that includes the axial line 41A. FIG. 11 is an exploded perspective diagram of the hinge device 4A. FIG. 12 is an exploded perspective diagram seen from a different angle from that of FIG. 11.

As shown in FIGS. 9 to 12, the hinge device 4A comprises a first turning member 60A into which a pivot 63A is incorporated, and a second turning member 70A having a pivot opening 71A into which the pivot 63A is inserted. The first turning member 60A and the second turning member 70A can turn relatively about the axial line 41A (the center of axle of the pivot 63A) as the center of turn. The first turning member 60A is attached to the first housing 2A. The second turning member 70A is attached to a hinge cover 170A (third housing), which is joined to the second housing 3A through a hinge unit 190A, etc. This enables the hinge cover 170A and the second housing 3A to turn relatively to the first housing 2A about the axial line 41A.

A flange 61A is formed integrally with the pivot 63A at the start end of the pivot 63A. A turn stopper 62A is formed at a portion of the rim of the flange 61A.

The first turning member 60A has a plate-like shape. A concave 51A is formed in one surface (the surface to be attached to the first housing 2A) of the first turning member 60A. An insertion opening 53A is formed through from the bottom of the concave 51A to the opposite surface. A locking recess 52A is concavely formed in a portion of the wall of the concave 51A.

The pivot 63A is inserted into the insertion opening 53A from the side of the surface in which the concave 51A is formed. The leading end of the pivot 63A projects to the other surface of the first turning member 60A. The start end of the pivot 63A is locked with the flange 61A fitted in the concave 51A and the turn stopper 62A fitted in the locking recess 52A. Thereby, the first turning member 60A is fixed on the pivot 63A so as not to turn about the axial line 41A. Though the first turning member 60A and the pivot 63A are separate components, they may be formed integrally.

A plate 160A is overlaid on the other surface (the surface at a side where the second turning member 70A is to be attached) of the first turning member 60A. The plate 160A is for concealing screw holes formed at the four corners of the first turning member 60A. An opening 161A is formed in the plate 160A.

A through hole 68A runs through inside the pivot 63A along the center of axle. A portion 64A of the pivot 63A that is close to the start end of the pivot 63A is formed in a cylindrical shape. A portion 65A of the pivot 63A that is close to the leading end of the pivot 63A is formed in a tubular shape. Here, the term "tubular" is used to be distinguished from the aforesaid "cylindrical". That is, the shape of the portion 65A close to the leading end is not circular, but the distance from the axial line 41A to a given point on the circumferential surface of the portion 65A is different from the distance from the axial line 41A to another point on the circumferential surface of the portion 65A.

Hereinafter, the portion 64A of the pivot 63A that is close to the bottom will be referred to as cylindrical portion 64A, and the portion 65A close to the leading end will be referred to as polygonal tubular portion 65A.

In FIGS. 9 to 12, a flange 66A is formed to the leading end of the pivot 63A. The flange 66A is formed by the leading end of the pivot 63A being staked after the hinge device 4A is assembled. Therefore, the flange 66A on the leading end of the pivot 63A is not formed before the hinge device 4A is assembled.

The pivot 63A is inserted through the insertion opening 53A of the first turning member 60A, the opening 161A of the plate 160A, a ring-shaped waterproof member 90A, a plain washer 100A, the pivot opening 71A of the second turning member 70A, a first click ring 110A, a second click ring 116A, a ring-shaped disk spring 120A, and a washer 130A, in this order.

The plain washer 100A strikes the upper end surface of the cylindrical portion 64A.

The waterproof member 90A forms a generally cylindrical shape, and has its upper end portion, which strikes the lower surface of the second turning member 70A, stretch like a trumpet. The waterproof member 90A is made of rubber relatively hard. The cylindrical portion 64A of the pivot 63A is fitted inside the waterproof member 90A. The inner diameter of the waterproof function 90A is equal to the outer diameter of the cylindrical portion 64A of the pivot 63A. The waterproof member 90A strikes the first turning member 60A.

A circular concave 72A is formed in one surface (the surface at the side of the first turning member 60A) of the second turning member 70A. The pivot opening 71A is bored from the bottom of the concave 72A to the surface at the other side of the second turning member 70A.

The waterproof member 90A is accommodated in the concave 72A, and strikes the bottom of the concave 72A so as to surround the pivot opening 71A. The diameter of the pivot opening 71A is smaller than the inner diameter of the waterproof member 90A.

The waterproof member 90A is sandwiched between the bottom of the concave 72A and the first turning member 60A. Being sandwiched between the bottom of the concave 72A and the first turning member 60A, the waterproof member 90A is slightly compressed and deformed.

The plain washer 100A is sandwiched between the bottom of the concave 72A and the upper end surface of the cylindrical portion 64A.

A circular concave 75A is formed in the surface at the other side of the second turning member 70A around the pivot opening 71A. Two locking recesses 76A are formed in portions of the wall of the concave 75A. The first click ring 110A is fitted in the concave 75A. Two turn stoppers 113A are formed at portions of the rim of the first click ring 110A. These turn stoppers 113A are fitted into the locking recesses 76A respectively. Thereby, the first click ring 110A is fixed so as not to turn relatively to the second turning member 70A about the axial line 41A. The pivot 63A can turn relatively to the first click ring 110A and the second turning member 70A about the axial line 41A.

The shape of an opening 117A of the second click ring 116A matches the shape of the outer circumference of the polygonal tubular portion 65A of the pivot 63A. The polygonal tubular portion 65A is fitted into this opening 117A. Thereby, the second click ring 116A is fixed so as not to turn relatively to the pivot 63A. The pivot 63A and the second click ring 116A turn integrally. In the state that the pivot 63A is inserted through the first click ring 110A and the second click ring 116A, the first click ring 110A and the second click ring 116A are in contact with each other.

Two convexes 112A are formed on one surface (the surface at the side of the second click ring 116A) of the first click ring 110A. The two convexes 112A are positioned 180-degrees apart with respect to the axial line 41A. Two concaves 118A are formed in one surface (the surface at the side of the first click ring 110A) of the second click ring 116A. As the first click ring 110A and the second click ring 116A turn relatively to each other, the convexes 112A slip from the concaves 118A or click in the concaves 118A again.

The disk spring 120A is annular. The disk spring 120A is independent from the pivot 63A. The disk spring 120A is inclined to a plane orthogonal to the axial line 41A, and thereby elastically deformed in the direction of the axial line 41A.

The shape of an opening 131A of the washer 130A matches the shape of the outer circumference of the polygonal tubular portion 65A of the pivot 63A. The polygonal tubular portion 65A is fitted in this opening 131A. Thereby, the washer 130A is fixed so as not to turn relatively to the pivot 63A. The washer 130A and the second click ring 116A turn integrally.

The flange 66A of the pivot 63A strikes the washer 130A around the opening 131A of the washer 130A. The first click ring 10A, the second click ring 116A, the disk spring 120A, and the washer 130A are sandwiched between the flange 66A and the bottom of the concave 75A. Further, the waterproof member 90A, the bottom of the concave 75A (or the bottom of the concave 72A), the first click ring 110A, the second click ring 116A, the disk spring 120A, and the washer 130A are sandwiched between the flange 66A and the first turning member 60A. In this way, the flange 61A and the flange 66A prevent the pivot 63A from slipping from the first turning member 60A, the second turning member 70A, the plate 160A, the waterproof member 90A, the plain washer 100A, the first click ring 110A, the second click ring 116A, the disk spring 120A, and the washer 130A.

In this sandwiched state, the disk spring 120A and the waterproof member 90A are slightly compressed and deformed. Since the waterproof member 90A is pressured to contact the bottom of the concave 72A and the first turning member 60A around the pivot opening 71A, even if water enters from outside through a gap between the upper surface of the first turning member 60A and the lower surface of the second turning member 70A, the water can be prohibited from entering the pivot opening 71A.

A stopper 67A is convexly formed on one surface (the surface at the side of the second turning member 70A) of the first turning member 60A around the insertion opening 53A. The stopper 67A is provided in the shape of an arc whose center is on the axial line 41A.

On the other hand, a stopper 77A is convexly formed in one surface (the surface at the side of the first turning member 60A) of the second turning member 70A around the concave 72A. The stopper 77A is formed in the shape of an arch whose center is on the axial line 41A.

The stopper 67A and the stopper 77A exist on the circumference of the same circle, whose center is on the axial line 41A. The total of the angle of the arc of the stopper 67A and the angle of the arc of the stopper 77A is 180 degrees. Hence, the range in which the stopper 67A can turn from the state that one end of the stopper 67A in the circumferential direction strikes one end of the stopper 77A in the circumferential direction to the state that the other end of the stopper 67A in the circumferential direction strikes the other end of the stopper 77A in the circumferential direction is 180 degrees.

The working of the hinge device 4A will be explained.

First, the second turning member 70A is stopped from turning clockwise relatively to the first turning member 60A, as the stopper 67A has its one end in the circumferential direction strike one end of the stopper 77A in the circumferential direction.

Further, as the convexes 112A click in the concaves 118A, the elasticity of the disk spring 120A acts to expand the distance between the flange 61A and the flange 66A, and the resulting counteracting force squeezes the components sandwiched between the flange 61A and the flange 66A. This also stops the second turning member 70A from turning anticlockwise relatively to the first turning member 60A. This state corresponds to FIGS. 7A to 7C and FIG. 8A.

When the second turning member 70A is caused to turn anticlockwise against the squeezing force of the disk spring 120A, the convexes 112A slip from the concaves 118A. When the convexes 112A slip from the concaves 118A, the convexes 112A force a gap between the first click ring 110A and the second click ring 116A. Since the disk spring 120A is deformed in response to this, the user can feel the repulsive force of the disk spring 120A as a clicking touch.

Then, when the second turning member 70A is caused to turn by 180 degrees relatively to the first turning member 60A, the convexes 112A click in the concaves 118A at the opposite sides. At this time, the disk spring 120A is restored to its original shape, and the user can feel the restoring force as a clicking touch. In this state, since the other end of the stopper 67A in the circumferential direction strikes the other end of the stopper 77A in the circumferential direction, the second turning member 70A is stopped from turning anticlockwise relatively to the first turning member 60A. This state corresponds to the state of FIG. 8D.

When the first turning member 70A is caused to turn relatively to the first turning member 60A, the waterproof member 90A slides on the bottom surface of the concave 72A of the second turning member 70A. In this case, the portion of the waterproof member 90A that contacts the bottom surface of the concave 72A is the upper end portion that stretches like a flared bell and since this upper end portion of the waterproof member 90A is pressured to contact the bottom surface of the concave 72A, the waterproofed state is maintained.

Figure 13:
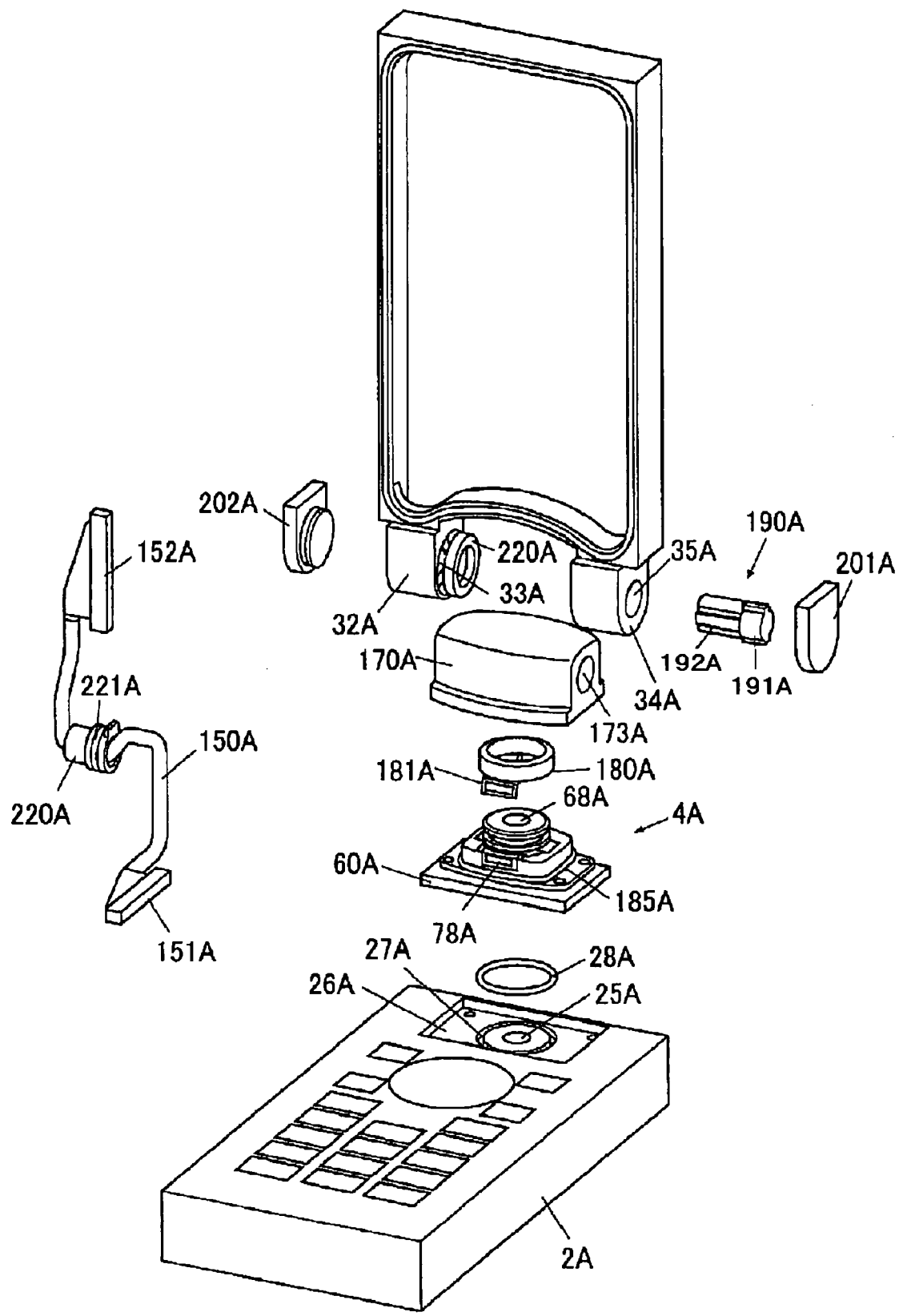
FIG. 13 is an exploded perspective diagram of the portable phone according to the second embodiment.
Figure 14:
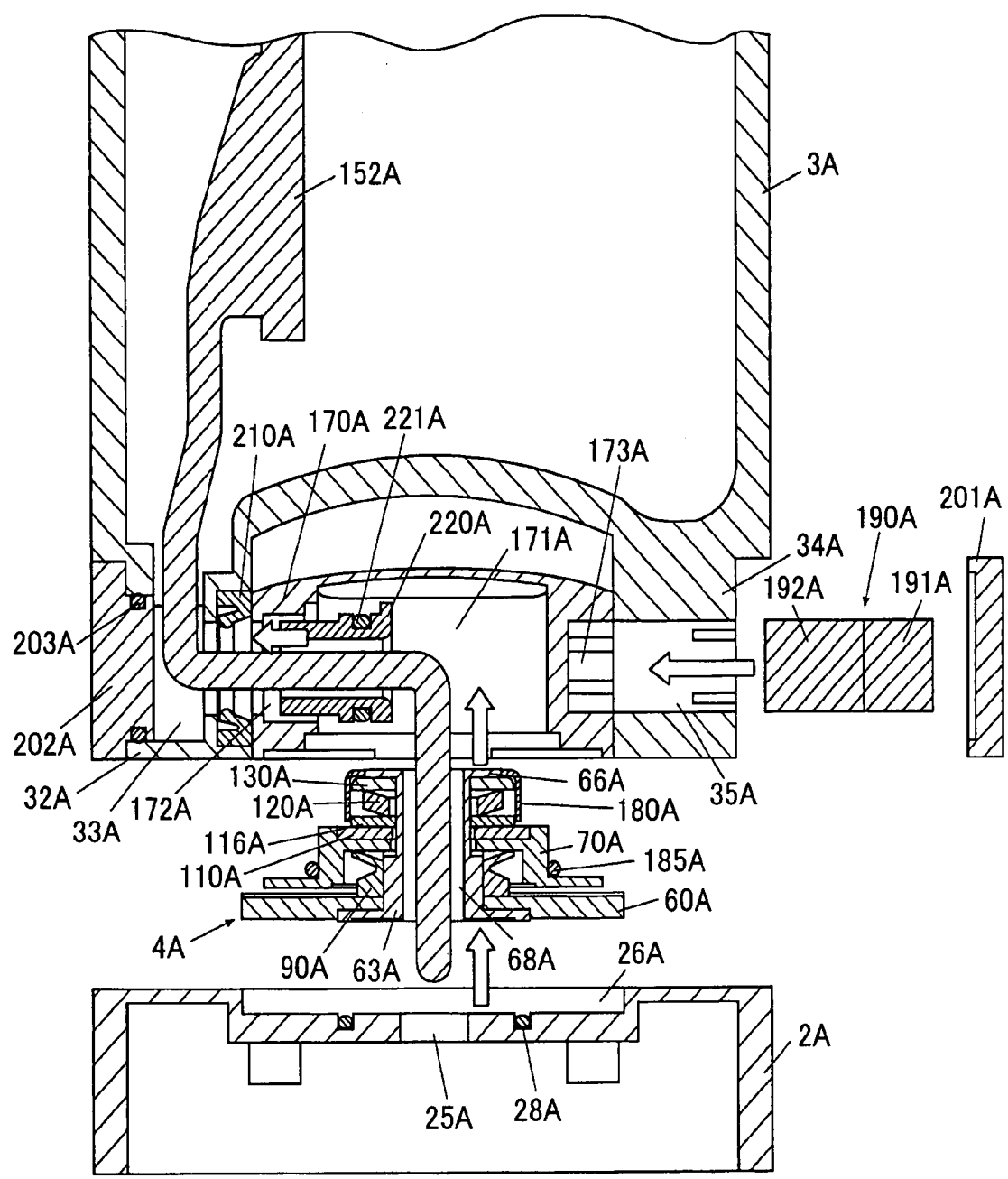
FIG. 14 is a diagram showing an exploded state of the portion shown in the cross sectional diagram of FIG. 9.

Next, how the biaxial hinge assembly 40A joins the first housing 2A and the second housing 3A will be explained with reference to FIG. 9, FIG. 13, and FIG. 14. FIG. 13 is an exploded perspective diagram of the portable phone 1A. FIG. 14 is a diagram showing an exploded state of the cross sectional diagram of FIG. 9.

As shown in FIG. 9, FIG. 13, and FIG. 14, an attaching concave 26A is formed in the front surface of the first housing 2A. An opening 25A is bored from the bottom of the attaching concave 26A into the inside of the first housing 2A. A ring-shaped groove 27A is concavely formed around the opening 25A.

A ring-shaped packing 28A is embedded in the groove 27A. The first turning member 60A of the hinge device 4A is fitted in the attaching concave 26A. The packing 28A is sandwiched between the flange 61A and the first housing 2A. The packing 28A is made of elastic material such as rubber, etc. Then, the first turning member 60A is threaded to the first housing 2A by screws. Hence, the hinge device 4A is attached on the first housing 2A. The packing 28A is compressed.

The first turning member 60A is screwed to the first housing 2A, in a state that the screw holes formed at the four corners of the first turning member 60A are exposed by the second turning member 70A and the plate 160A being turned by 90 degrees relatively to the first turning member 60A.

The flange 66A, the washer 130A, the disk spring 120A, and the second click ring 116A of the hinge device 4A are fitted inside a rubber ring 180A. The rubber ring 180A has tab hooks 181A. Tabs 78A are formed on the second turning member 70A. With this structure, the rubber ring 180A is secured to the hinge device 4A with the tabs 78A locked on the tab hooks 11A.

The hinge cover 170A has an inner space 171A to accommodate a part of the hinge device 4A at the side of the second turning member 70A. The inner space 171A is opened free, at the lower surface of the hinge cover 170A. The part of the hinge device 4A at the side of the second turning member 70A is accommodated into the inner space 171A from the free opening at the lower side of the inner space 171A, with a ring-shaped packing 185A attached on the hinge device 4A. The packing 185A is made of elastic material such as rubber, etc. The second turning member 70A of the hinge device 4A is fixed on the lower surface of the hinge cover 170A by screws. Thereby, the hinge cover 170A and the first housing 2A are joined. That is, the hinge cover 170A and the first housing 2A are joined via the hinge device 4A. Therefore, the hinge cover 170A is able to turn relatively to the first housing 2A about the axial line 41A (the center of axle of the pivot 63A).

Around the free opening at the lower side of the inner space 171A, the ring-shaped packing 185A is compressed between the second turning member 70A and the hinge cover 170A. Accordingly, water is prohibited from entering the inner space 171A if there is water in the gap between the second turning member 70A and the hinge cover 170A.

The second turning member 70A of the hinge device 4A is screwed to the hinge cover 170A, in a state that screw holes formed at four corners of the second turning member 70A are exposed by the second turning member 70A being turned by 90 degrees relatively to the first turning member 60A.

A through hole 172A is formed in the wall of the hinge cover 170A at the left-hand side of the drawing. The through hole 172A communicates with the inner space 171A. A concave 173A is formed in the right-hand wall of the hinge cover 170A. The concave 173A does not communicate with the inner space 171A.

Supports 32A and 34A for sandwiching the hinge cover 170A are formed on the end of the second housing 3A. Of them, one support 32A has a pivot opening 33A formed therein so as to penetrate therethrough in the direction of the axial line 42A. The other support 34A also has a pivot opening 35A formed therein so as to penetrate therethrough in the direction of the axial line 42A. When the hinge cover 170A is sandwiched between the support 32A and the support 34A, the pivot opening 33A coincides with the through hole 172A and the pivot opening 35A coincides with the concave 173A.

The hinge unit 190A penetrates through the pivot opening 35A from the right to the left of the drawing to be further inserted into the concave 173A. The hinge unit 190A comprises a first fitting portion 191A which is supported by the support 34A while being fitted in the pivot opening 35A, and a second fitting portion 192A which is supported by the hinge cover 170A while being fitted in the concave 173A. The first fitting portion 191A can turn relatively to the second fitting portion 192A about the axial line 42A. A cover 201A is placed at the right-hand side of the support 34A. The cover 201A closes the pivot opening 35A.

Instead of the hinge unit 190A, an axial rod may be used to obtain a simplified structure in which the axial rod can turn relatively to one or both of the hinge cover 170A and the support 34A.

A ring-shaped waterproof material 210A is sandwiched between the hinge cover 170A and the support 32A. The waterproof material 210A surrounds the pivot opening 33A and the through hole 172A. An axial member 220A goes through the through hole 172A leftward from the inner space 171A to be further inserted into the pivot opening 33A and the waterproof material 210A. The axial member 220A can turn relatively to one or both of the hinge cover 170A and the support 32A.

As described above, the hinge cover 170A is joined to the first housing 2A by the hinge device 4A and also joined to the second housing 3A by the axial member 220A and the hinge unit 190A. Accordingly, the hinge cover 170A and the second housing 3A joined to the hinge cover 170A are enabled to turn relatively to the first housing 2A about the axial line 41A (the center of axle of the pivot 63A), and the second housing 3A is enabled to turn relatively to the hinge cover 170A and the first housing 2A joined to the hinge cover 170A about the axial line 42A (the center of axle of the axial member 220A and hinge unit 190A).

A packing 221A is sandwiched between the axial member 220A and the wall of the through hole 172A. This keeps them watertight. A cover 202A is put over the support 32A at its left-hand side in the drawing. The cover 202A closes the pivot opening 33A. A ring-shaped packing 203A is sandwiched between the cover 202A and the support 32A around the pivot opening 33A. The packing 203A keeps the watertightness.

A connecter 151A at one end of a wire 150A is connected to a circuit board inside the first housing 2A. The wire 150A is let through the through hole 68A of the pivot 63A. The wire 150A is, for example, a bundle of thin coaxial cables.

The axial member 220A has a through hole 222A formed thereinside along its axial line. The wire 150A is let into this through hole 222A from the through hole 68A via the inner space 171A.

The pivot opening 33A of the support 32A communicates with the interior of the second housing 3A. The wire 150A extends into the interior of the second housing 3A from the through hole 222A via the pivot opening 33A. Then, a connecter 152A at the other end of the wire 150A is connected to a circuit board inside the second housing 3A.

Next, how to assemble the bidirectional hinge assembly 40A will be explained.

The connecter 152A is placed inside the second housing 3A.

The wire 150A is let through the pivot opening 33A and the waterproof material 210A. The wire 150A is further let through the through hole 172A of the hinge cover 170A and the axial member 220A. When the wire 150A is let through the pivot opening 33A, etc., the wire portion near the connector 151A is wound around the connector 151A.

Then, the hinge cover 170A is inserted between the support 32A and the support 34A. Then, the axial member 220A is fitted into the through hole 172A and the pivot hole 33A from the inside of the hinge cover 170A. The hinge unit 190A is fitted into the pivot opening 35A and the concave 173A.

Next, the flange 66A, the washer 130A, the disk spring 120A, and the second click ring 116A of the hinge device 4A are fitted inside the rubber ring 180A, and the tabs 78 are locked on the tab hooks 181A. The packing 185A is attached on the hinge device 4A.

Then, the wire 150A is let through the through hole 68A. Then, the hinge device 4A is inserted into the inner space 171A of the hinge cover 170A, and the second turning member 70A is secured on the hinge cover 170A by screws. In this case, the second turning member 70A is turned by 90 degrees relatively to the first turning member 60A to expose the screw holes formed at the four corners of the second turning member 70A, and then the second turning member 70A is screwed from the lower side thereof.

Subsequently, the packing 28A is fitted in the groove 27A, the wire 150A is let through the opening 25A, and the first turning member 60A is fitted in the attaching concave 26A.

Then, the first turning member 60A is secured on the first housing 2 by screws. In this case, the second turning member 70A and the plate 160A are turned by 90 degrees relatively to the first turning member 60A to expose the screw holes formed at the four corners of the first turning member 60A, and thereafter the first turning member 60A is screwed from its side.

As described above, according to the present embodiment, water that enters through the gap between the first turning member 60A of the hinge device 4A and the first housing 2A can be prevented by the packing 28A from entering the first housing 2A through the opening 25A.

Further, water that enters through the gap between the first turning member 60A and the second turning member 70A of the hinge device 4 can be prevented by the waterproof member 90A from entering the inside of the hinge cover 170A through the pivot opening 71A of the second turning member 70A.

Furthermore, water that enters through the gap between the second turning member 70A of the hinge device 4A and the hinge cover 170A can be prevented by the packing 185A from entering the inner space 171A of the hinge cover 170A.

Still further, water that enters through the gap between the support 32A of the second housing 3A and the hinge cover 170A can be prevented by the waterproof material 210A and the packing 221A from entering the pivot opening 33A and the inner space 171A of the hinge cover 170A.

Yet further, water that enters through the gap between the support 32A of the second housing 3A and the cover 202A can be prevented by the packing 203A from entering the pivot opening 33A and the second housing 3A.

The present invention is not limited to the above-described embodiments, but may be modified or changed in design in various manners within the scope of the meaning of the present invention.

For example, in the first embodiment, the first turning member 60 is fixed on the first housing 2 and the second turning member 70 is fixed on the second housing 3. However, the first turning member 60 may be fixed on the second housing 3 and the second turning member 70 may be fixed on the first housing 2. Likewise, in the second embodiment, the first turning member 60A is fixed on the first housing 2A and the second turning member 70A is fixed on the hinge cover 170A. However, the first turning member 60 may be fixed on the hinge cover 170A and the second turning member 70 may be fixed on the first housing 2.

As easily understood from the hinge device 4 exemplified in the first embodiment and the hinge device 4A exemplified in the second embodiment, the shapes of the first turning members 60 and 60A and second turning members 70 and 70A may be arbitrarily changed according to how these members are attached to the housings. Further, the shapes and arrangement positions of the packings, as the waterproofing means between the first turning members 60 and 60A or the second turning members 70 and 70A and the housings to which they are attached, may be arbitrarily changed according to the shapes and attaching methods of the first turning members 60 and 60A and second turning members 70 and 70A. For example, in a case where the hinge device 4A exemplified in the second embodiment is used as the hinge device for joining the first housing 2 and the second housing 3 of the first embodiment, at least one of the first turning member 60A and the second turning member 70A needs to be screwed from the inside of the housing. In a case where at least one of them is screwed from the inside of the housing, the packing 28A or the packing 185A need to be provided more externally than the screwed portions.

In the first and second embodiments, the body of the waterproof members 90 and 90A for waterproofing the pivot openings 71 and 71A of the hinge devices 4 and 4A forms a generally cylindrical shape, and the upper end portion thereof stretches like a trumpet. However, the waterproof members 90 and 90A may have their lower end portion, which strikes the upper surface of the first turning members 60 and 60A, stretch like a trumpet, or may have both the upper and lower end portions stretch like a trumpet.

Further, the first embodiment and the second embodiment described above have been explained by employing a portable phone as the portable electronic apparatus. However, the present invention can be applied to a laptop personal computer, a digital camera, a video camera, a wristwatch, a PDA (Personal Digital Assistant), an electronic diary, a portable wireless device, and other electronic apparatuses, as long as they are a portable electronic apparatus which comprises a first housing and a second housing, which can turn while kept in parallel with each other.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2006-099825 filed on Mar. 31, 2006 and Japanese Patent Application No. 2006-268284 filed on Sep. 29, 2006 and including specification, claims, drawings and summary. The disclosures of the above Japanese Patent Applications are incorporated herein by reference in their entireties.

What is claimed is:

1. A hinge device, comprising:
   a first member incorporating a pivot in which a through hole is formed in a direction of axis of the pivot;

a second member having pivot opening into which the pivot is inserted, and capable of turning relatively to the first member about the pivot as a center of turn; and a waterproof member formed in a tube shape, and sandwiched between the first member and the second member so as to surround a gap between the pivot and the pivot opening;

wherein the waterproof member has at least either a first portion contacting the first member or a second portion contacting the second member, the at least either a first portion or a second portion of the waterproof member stretched in the form of a flared bell;

wherein the first member forms a shape of a flat plate, the second member has a concave formed in a bottom surface of the second member facing the flat plate of the first member, and the waterproof member is accommodated in the concave and seals against the flat plate of the first member.

2. The hinge device according to claim 1, wherein the concave is formed in one surface of the second member that is at a side of the first member, and the pivot opening penetrates the concave from a bottom of the concave to an opposite surface thereof, and the waterproof member is sandwiched between the bottom of the concave and the first member.

3. A portable electronic apparatus having a first housing, a second housing, and a hinge device for joining the first housing and the second housing such that the first housing and the second housing are capable of turning about an axial line orthogonal to a front surface of the first housing, wherein the hinge device comprises:

a first member incorporating a pivot in which a through hole is formed in a direction of axis of the pivot;

a second member having a pivot opening into which the pivot is inserted, and capable of turning relatively to the first member about the pivot as a center of turn; and a waterproof member formed in a tube shape, and sandwiched between the first member and the second member so as to surround the pivot and the pivot opening, and wherein one of the first member and the second member is attached to the first housing with a first waterproof packing provided between them, and the other is attached to the second housing or a third housing joined to the second housing with a second waterproof packing provided between them;

wherein the waterproof member has at least either a portion, which contacts the first member, or a portion, which contacts the second member, the at least either a first portion or a second portion of the waterproof member stretched in the form of a flared bell:

wherein the first member forms a shape of a flat plate, the second member has a concave formed in a bottom surface of the second member facing the flat plate of the first member, and the waterproof member is accommodated in the concave and seals against the flat plate of the first member.

4. The portable electronic apparatus according to claim 3, wherein the concave is formed in one surface of the second member that is at a side of the first member, and the pivot opening penetrates the concave from a bottom of the concave to an opposite surface thereof, and the waterproof member is sandwiched between the bottom of the concave and the first member.

5. The portable electronic apparatus according to claim 3, wherein the third housing and the second housing are joined to each other such that they are capable of turning about an axial line orthogonal to the axis of the pivot.

6. The portable electronic apparatus according to claim 5, wherein the first member is attached to the first housing, and the second member has the concave for accommodating the waterproof member formed in one surface thereof that is at a side of the first member, and is attached to the third housing while its portion, in which the concave if formed, is accommodated in the inner space.

7. The portable electronic apparatus according to claim 6, wherein the first member forms a shape of a flat plate, and is attached to the first housing, and the second member has a concave for accommodating the waterproof member formed in one surface thereof that is at a side of the first member, and is attached to the third housing while its portion, in which the concave is formed, is accommodated in the inner space.

8. The portable electronic apparatus according to claim 6, further comprising a ring-shaped waterproof material which is provided between the second support and the wall of the third housing, and through which the second axial member can be inserted.

9. The portable electronic apparatus according to claim 6, wherein a wire for connecting a circuit inside the first housing and a circuit inside the second housing runs through the through hole of the pivot, the inner space, and an inside of the second axial member.

* * * * *